July 7, 1970

H. L. BAUMBACH 3,519,524

SPLICE FOR THE ADJACENT ENDS OF TWO
PHOTOGRAPHIC FILM STRIPS

Filed Nov. 17, 1967

INVENTOR.
HARLAN L. BAUMBACH
BY Forrest J. Lilly
ATTORNEY

July 7, 1970
H. L. BAUMBACH
3,519,524
SPLICE FOR THE ADJACENT ENDS OF TWO
PHOTOGRAPHIC FILM STRIPS
Filed Nov. 17, 1967
2 Sheets-Sheet 2
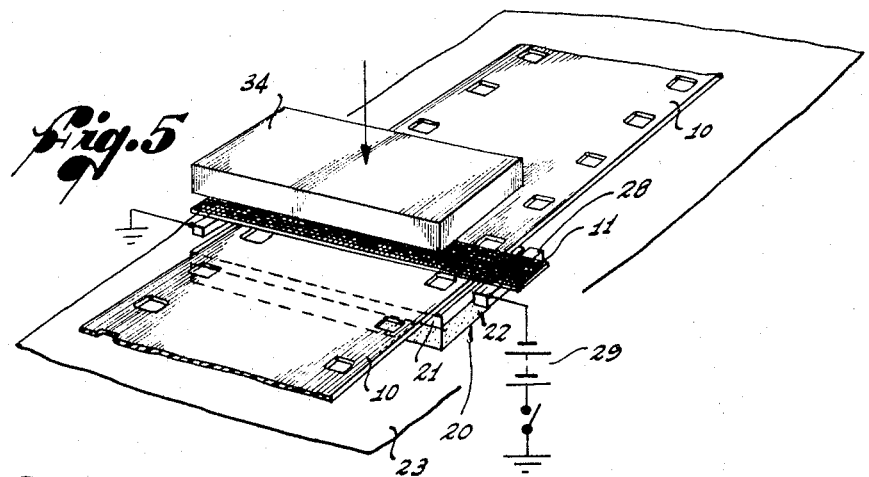
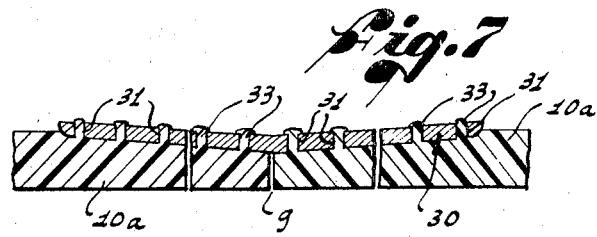
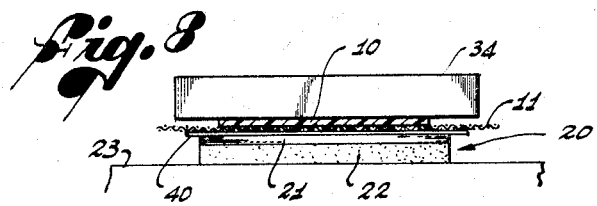
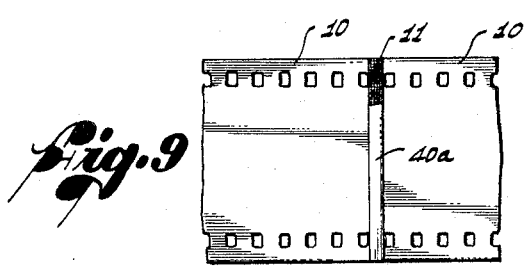
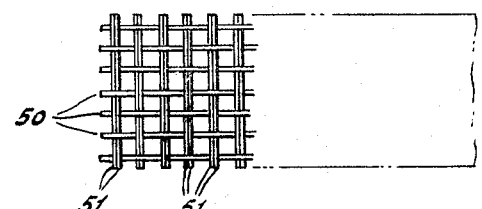
INVENTOR.
HARLAN L. BAUMBACH
BY Forrest J. Lilly
ATTORNEY

United States Patent Office 3,519,524
Patented July 7, 1970

3,519,524
SPLICE FOR THE ADJACENT ENDS OF TWO
PHOTOGRAPHIC FILM STRIPS
Harlan L. Baumbach, 14332 Mulholland Drive,
Los Angeles, Calif. 90024
Filed Nov. 17, 1967, Ser. No. 683,909
Int. Cl. B32b 7/10
U.S. Cl. 161—38                                    12 Claims

ABSTRACT OF THE DISCLOSURE

A splice and splicing process for photographic film strip. The meeting ends of two film strips are connected by a narrow, foraminous, metallic strip, which bridges across the meeting ends of the strips This strip is preferably a 150 mesh screen, woven of fine wire. The screen is partially embedded into the surface of the plastics film material by heating it electrically and then pressing it down, causing the film material adjacent the screen wires to melt the adjacent portions of the film. Thus, the screen sinks partially into the film, and plugs or studs of the film substance are extruded upwards through the screen perforations. A large number of these rise above the screen wires, and then flow laterally, forming heads or portions of heads projecting laterally partially over the wires for securely locking the screen to the film.

FIELD OF THE INVENTION

This invention relates generally to a novel and improved splice and splicing method for photographic film.

BACKGROUND OF THE INVENTION

There is frequent need for splicing picture film in the motion picture, television, and still picture film fields, and numerous types of splice, methods of splicing, and splicing machines have been used in the past; and, of course, a number are in current usage. The best film splices known to date, however, leave large room for improvement in certain areas, and the present invention seeks to provide a novel film splice and splicing process, improved as regards the security and permanence of the splice, its resistance to plastic flow deformation under tensile stress, and also by the simplicity and speed with which it can be made. It is an object of the invention to provide a splice which cannot be pulled apart, nor deformed, no matter to what tension the film strip using it may be subjected. In another manner of expression, it is an object to make film splice which is stronger in tension than the film strip itself, so that under extreme tension, the film strip itself will pull apart prior to failure of the splice.

SUMMARY OF THE INVENTION

The splice of the invention uses a metallic foraminous strip to span across the adjacent ends of the two film strips to be spliced. This strip is positioned to extend transversely of the film strips, bridging across the narrow end portions thereof, and embedded down into and partially below the surface of the film base. The embedding is accomplished by heating the splicing strip, as by passing an electric current through it, and pressing it down against the film base. The film base is thereby locally melted sufficiently to acept the foraminous strip, and small "necks" or plugs of the melted plastic material of the film base are extruded up into and through the perforations of the splicing strip. A large number of these form heads which project over or overlie portions of the strip between its perforations, and thus interlock the splicing strip with the film. These necks, plugs, or extrusions function as headed rivets or studs. The invention requires that a very large number of such "rivets" or "studs" be provided, and that a large number of them have heads in interlocking relationship with the film. A preferred form of foraminous strip comprises a 150 mesh screen, woven of fine wire, of a few thousandths of an inch in diameter, e.g., .0025". This strip, which is about .004" in thickness in the practive of the invention, is sunk approximately half its thickness into the film base. Assuming a film base of .006" thickness, the film base then has a remaining thickness of undisturbed material of the order of .004", which is very satisfactory.

DESCRIPTION OF THE DRAWINGS

The invention can be discusesed to beter advantage by referring to the accompanying drawings, in which:

FIG. 3 is a plan view of a portion of the splice shown in FIG. 2a;

FIG. 5 is a perspective view of equipment for making the splice;

FIG. 6 is a plan view of an alternative splicing strip in accordance with the invention;

FIG. 7 is a longitudinal sectional view of two spliced film strip ends, using the modified splicing strip of FIG. 6;

FIG. 8 is a side elevational view of the platen and pressure pad, with a film strip therebetween, and showing also the splicing screen as well as a plastic cover strip;

FIG. 9 is a plan view of the splice made in accordance with FIG. 8; and

FIG. 10 is a fragmentary enlarged plan view of a portion of a modified type of screen splicing strip.

DESCRIPTION OF THE PREFERRED EMBODIMENT

The strongest film splice according to the invention is obtained by a compromise of certain contributing factors, as will be set forth hereinafter. The specific preferred splice to be described comprises my best optimized combination of these factors.

Figure 1:
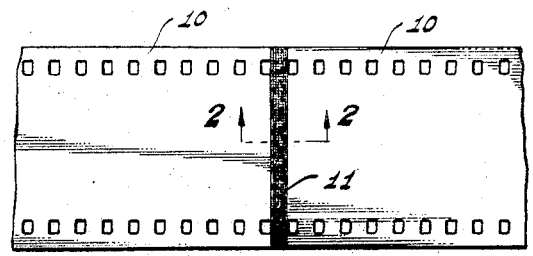
FIG. 1 is a plan view of a film strip containing a splice in accordance with the present invention.
Figure 2:
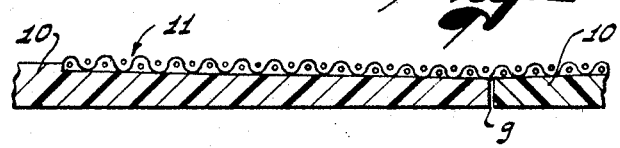
FIG. 2 is an enlarged and somewhat diagrammatic section taken on line 2—2 of FIG. 1.
Figure 3:
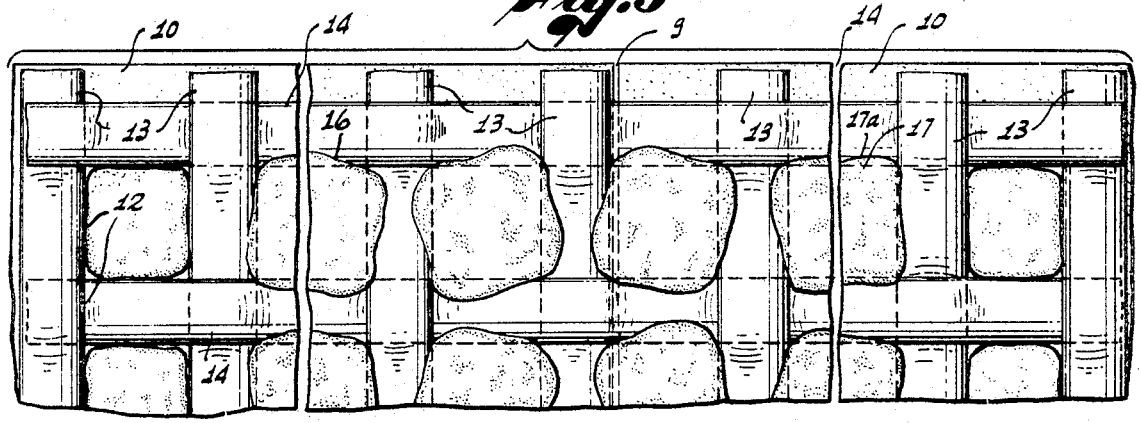

Referring to FIGS. 1–3, two film strips 10 are placed end to end preferably with a slight gap g therebetween, as of the order of .015". The ends of these film strips are connected by a metal, foraminous, splicing strip 11 overlapping relatively narrow end edge portions of the film strips on opposite sides of the gap therebetween. The splicing strip may advantageously be one-eight inch in width, particularly for 35 mm. film, i.e., so as to fit fairly well between successive film perforations, and thus permit entry of sprocket teeth without necessity of re-perforating. For 16 mm. film, the strip may be up to one-fourth inch in width and still fit between perforations. The best and most advantageous form of my invention that I have discovered, and with which I have attained the most outstanding qualities, uses for the splicing strip a fine mesh metallic wire screen of 150 mesh, woven of a very fine wire, e.g., .0025", or on that order. The screen may be composed of different metals, for different qualities. For example, type 316 stainless steel is very suitable for nearly all applications, though sensitive to photographic bleaches. A high chromium and nickel alloy, sold currently under the trademark "Hastalloy," is exceptionally strong and is ideal. For projection film, I may use brass.

The preferred 150 mesh screen, woven of wire of diameter of .0025" (less than the diameter of a human hair), is available in a screen of a thickness of substantially .006". I have discovered that a definite advantage accrues from rolling this screen to a thickness of substantially .004" prior to use. At this lesser thickness, the screen need not be received quite so deep into the film, leaving a larger undisturbed thickness of film for strength. This is a very desirable feature, as it is important to leave as much undisturbed film base thickness as possible, particularly with common film bases of around .005" to .006" in thickness. Some polyethylene terephthalate film, sold under the trademark Mylar may go down to .003". In such case, the screen may advantageously be, or be rolled to, .003", and be embedded to half its thickness.

As will be seen from the enlarged and somewhat exaggerated views of FIGS. 2 and 3, the 150 mesh screen splicing strip 11 as described forms a multiplicity of perforations 12 between crossing wires 13 and 14. These perforations, with screen, are substantially square, and at 150 mesh, and a wire diameter of .0025", are approximately .004" on a side. As has been mentioned in the introductory part of this specification, this screen strip is sunk partially (to approximately half its thickness) into the film base, and this is accomplished by heating the screen, and thereby the adjacent portions of the film (which is a thermoplastic material), and then exerting pressure on the heated screen, so that the film immediately around the heated wires is melted, and the screen, under applied pressure, sinks partially into the film base. In this operation, melted portions of the film, displaced by the sinking wires, are extruded upwardly into the screen perforations 12, forming integral necks or "rivets" 16 tightly fitting the wires defining the perforations 12. Moreover, and of the greatest importance, a large number of these extrusions are formed with heads 17 having laterally projecting head portions 17a which overlie portions of the screen wires 13 and 14. The screen is thus interlocked with the film by these laterally projecting heads or head portions 17 or 17a, and the splice can fail by peeling of the screen from the film only by breaking off these interlocking heads or head portions. The total linear length along which such breakage or shear will take place is of course a factor in the strength of the splice against it; and it should be clear that, within practical limits, the total linear length can be maximized by using small, close-spaced rivets in very large number, such as is achieved by use of rivets extruded through a 150 mesh screen. The resistance of the splice against this type of failure is so high, as a matter of fact, that a film incorporating the splice, if tensioned to failure, will fail at some point along the film other than at the splice.

On the other hand, the splice of the invention, with its large multiplicity of close-spaced rivets or studs, and its long length of wire around the same, is strong against failure in longitudinal tension by shearing of these rivets or studs from the film in planes parallel to the film. Again, the splice of the invention is stronger in tension than the film strip.

Figure 2A:
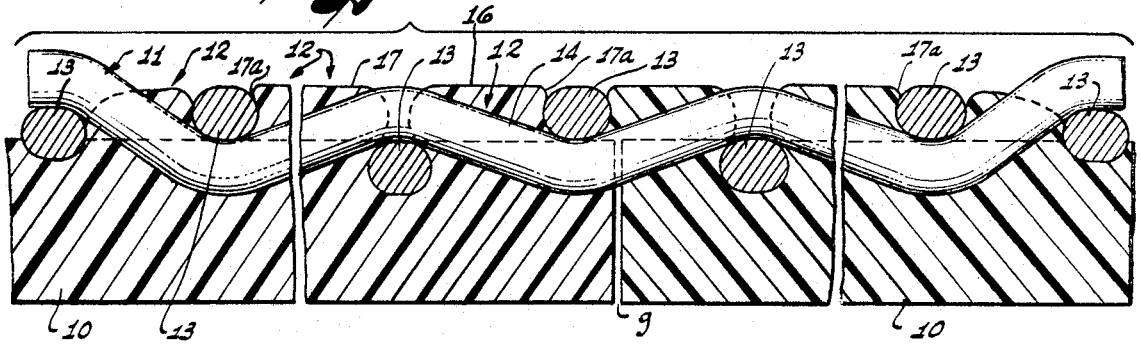
FIG. 2a is a still further enlarged view similar to FIG. 2.

An important refinement represented diagrammatically in FIGS. 2 and 2a is to progressively decrease the depth of embedding of the screen strip into the film base in the direction away from the end edge of the film strip. Thus, assuming the film base to be .006" in thickness, and a rolled 150 mesh screen to have a thickness of .004", the screen may be sunk into the film base .002" at the end edge of the film, so as to give a total thickness of spliced film of .0080" at that point, and may be sunk into the film base a distance of approximately 6 to 14 ten thousandths less than .002" at the outermost edges of the screen strip. A strong well made splice has been calipered at .0092" at the outside edges of the screen strip, meaning a sinking depth of .0008" for the screen into the film base at these points, and a difference in sinking depth of .0012" from the center of the screen to each edge. The advantage here is to afford more gradual transition, and therefore better strength, from the region of the film base partially containing the film to the region thereof beyond the splice, with reduced concentration of stress in the film base at the outermost edges of the embedded portions of the screen.

As mentioned hereinabove, the selection of various parameters entering into the ultimate strength of the splice is highly important, and constitutes a part of the invention.

First of all, the thickness of screen selected should be small, so as to maximize the thickness of undisturbed or residual film base left after making the splice. It is therefore desirable, from this standpoint, to select as thin a screen as possible. A 150 mesh screen, rolled to a thickness of .004", or even .003" in some cases, meets this requirement very satisfactorily.

As against this, if the screen or the screen wire be too thin, e.g., a 325 mesh screen, made of .0014" wire, the splice becomes undesirably weak, the joint being subject to undue flexing, eventual fatigue failure, and to tearing. I have found, further, that 200 mesh screen may be somewhat prone to tearing, depending upon materials used, and a somewhat larger mesh is therefore generally desirable. For some uses, a screen of a mesh as large as 200 may, however, be used, but is about at the limit of usefulness with materials presently available.

It is further desirable to use a screen which is sufficiently stiff that flexing will not occur preferentially at the splice, since such flexing leads to early fatigue failure. In this regard, the wire of the screen, under flexing conditions, tends to work harden, and then to become fatigued and suffer early failure. Screen of 150 mesh is found to meet this requirement very satisfactorily, with some leeway, of course, on both sides, the outside limit being approximately in the range of 200 mesh, and the lower limit being around 100 mesh, depending upon materials. Screen formed of wire of .0045" diameter, woven to 100 mesh, is particularly appropriate for the thicker film bases.

A further factor is that, since the strength of the splice depends upon the number of rivets, or rivet heads, the fine mesh is favored over a coarse mesh, until other factors militating against very fine mesh are encountered.

A critical ratio in the invention is that the depth to which the screen is embedded into the film base should be at least approximately half its thickness along the end edge of the film base; and also that there be a thickness of residual undisturbed film base under the screen strip which affords a tensile strength sufficient to withstand the maximum tensile stress that will be encountered in this region in service. This minimum thickness will in general be on the order of approximately .004", with some possible exceptions in cases of extraordinarily strong base materials.

The preferred splice mentioned hereinabove, 150 mesh screen, of .0025" wire, rolled to a thickness of from .006" to .004", and fabricated in the form disclosed hereinabove, has been proved to yield ideal results.

Figure 4:
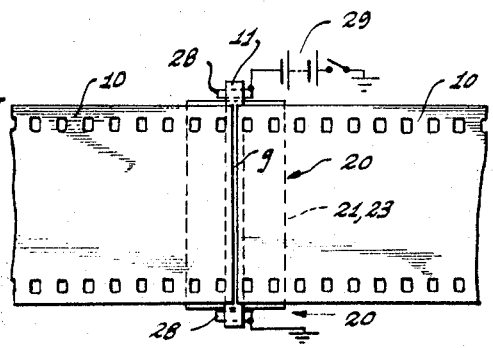
FIG. 4 is a plan view of a film strip overlying a splicing screen, and illustrating a step in the making of the splice.

The process by which the splice of the invention is made is illustrated in FIGS. 4 and 5. A strip 11 of the splicing screen, one-eighth inch wide, of 35 mm. film is to be used, and of a length somewhat longer than the width of the film, is placed across a platen 20, and overhangs the edges of the latter, as represented in FIGS. 4 and 5. The platen 20 comprises a heat insulating pad 21 of silicone rubber, one-sixteenth inch thick, and about as hard as the usual conventional rubber eraser, and below it, a sheet 22 of compressible sponge rubber, about one-eighth inch thick. Sheet 22 is mounted on a stationary table 23. The two film strips 10 are trimmed square at the ends, and then positioned end to end on the platen 20, over the screen, uniformly on opposite sides of the longitudinal center line of the screen, with a predetermined gap g, say .015", between adjacent ends. The trimming and positioning is such that, assuming 35 mm. film, the last perforations of the two strips are at standard perforation spacing distance apart, i.e., substantially one-eighth inch, and are hence adjacent the edges of the screen.

The screen strip 11 extends beyond the edges of the film and of the platen on both sides, so as to overlie brass electrical contact blocks 28. The latter are in circuit with a battery 29, which circuit includes the screen strip 11 when the latter is in contact with contact blocks 28, so that current flows through and heats the screen strip.

A pressure pad 34, composed of a good heat resistant material such as polytetrafluoroethylene, known as Teflon, is movable downwardly onto the sandwich comprised of the screen strip and film ends, and forced downwardly on the platen supporting these elements, compresses the sponge rubber pad 22 of the platen to about one-half its normal thickness. The "sandwich" is thus compressed between the pad and the platen, the pressure being derived from the compressed, resilient, sponge rubber pad 22. Also, the depression of the platen accompanying the compression of pad 22 causes the ends of the screen strip 11 to be pressed down tightly and into good electrical contact with the stationarily mounted contacts 28. Switch Sw is then closed, sending heating current through the wire screen and heating it instantly to a temperature at which the heated screen wires melt the plastic substance of the film base material immediately thereadjacent. The time interval of electric heating current flow must of course be adjusted to different screen metals, but a half-second, using a twelve volt battery, is typical. The heating of the screen is to be such that, under the pressure exerted, the screen melts its way down into the plastic base to a distance about equal to half its thickness, so that the aforementioned headed extrusions or rivets are formed and caused to flow or spread laterally at their upper ends, forming heads which interlock with the wires of the screen. Lateral flow, and good head formation, to accomplish good interlock, is caused of course by engagement of the extrusion with the underside of the pressure pad 34. The screen strip tends naturally to become most highly heated along its longitudinal center line, with a temperature gradient from this line toward each edge of the screen. Accordingly, by carefully limiting the heat, by control of either time or current flow, such a temperature gradient condition can be produced, and has the effect that the screen strip sinks most deeply into the film base at the end extremity of the film base, i.e., along the central area of the strip, and not so deeply at the edges of the strip, so as to provide the slight curve or taper of the screen relative to the film base as referred to hereinabove, and depicted in FIGS. 2 and 2a. The yieldable quality of the silicone rubber pad 21 permits conformation of the pad to the screen strip as the latter assumes its curved or tapered configuration. The result in this case is that fully formed rivets with good heads are obtained down the center of the splice, on both sides of the film gap, with these heads becoming gradually more vestigal towards the opposite edges of the screen strip.

Of great importance is that the heat be limited so as not to materially affect the residual film base layer below the embedded screen. The splice can be greatly weakened if the heat is permitted to flow too much down into the base material below the screen. Accordingly, the current is interrupted and heating stopped as soon as desired screen penetration into the base is attained. A very little experimentation with heating time leads to attainment of the desired result.

FIG. 6 shows a modification, wherein the foraminous splicing strip comprises a thin metallic plate 30 with a very large number of very small perforations 31, preferably of the same dimensional order as those of the screen. However, the plate form of the invention is not so subject to tearing as the screen, and even thinner material can therefore be used. The plate can be of any of the materials as mentioned hereinabove for the screen form of the invention.

FIG. 7 shows the plate type splicing strip embedded partially into the bases of two film strip ends 10a, and shows headed extrusions, i.e., rivets 33, extending through the perforations and interlocking with the splicing plate. The ends of the plate 30 are preferably rounded over, on the undersides, to relieve stresses in the film base material, and thus contribute to the strength of the splice.

FIGS. 8 and 9 show the location of a plastics protective strip over the splicing screen. A strip 40 of thin cellulose acetate, for example, may be placed under the screen on the platen, as in FIG. 8. This strip melts and fuses to the screen strip when the latter is heated, affording a smooth covering layer as indicated at 40a in FIG. 9. This covering layer prevents scratching of adjacent film when the film is rolled.

The screen type splicing strip referred to hereinabove has been successfully made by use of single cross-woven wires, in a mesh common in ordinary window screens, but of course much finer in wire and mesh size. The strip may be obtained from a sheet of screen by slitting to proper width, and then cutting it to desired lengths. Such a screen strip of course has raw edges, and if in any application it should become desirable to eliminate such raw edges, the screen can be woven initially in narrow widths, with a selvage along each edge. It is also possible to strengthen the splice by weaving the screen with single warp wires running in the direction longitudinally of the strip, and with two, or even three, weft wires running transversely of the strip. In other words, each mesh is then defined, at two edges longitudinally of the strip, by two parallel but spaced wires 50 and at each of its two edges transversely of the strip by two wires 51 placed side by side, as represented in FIG. 10. This construction permits use of a screen so fine in wire size as might otherwise tear at the splice, but which is possessed of greatly increased strength, and which, notwithstanding its fineness and flexibility, will withstand tension up to and exceeding the tensile strength of the film base. Such a screen, made very thin, is particularly advantageous with thin Mylar film, for example.

I claim:

1. A splice for the adjacent ends of two photographic film strips, positioned end to end, each embodying a thin thermoplastic base of a thickness dimension of the order of thousandths of an inch, comprising:
a foraminous metal splicing strip, having a large multiplicity of perforations therethrough, and of a thickness of the same order, but less than the thickness of said film strip base, said splicing strip extending transversely of the film strips, from edge-to-edge thereof and overlying and bridging across the joint between adjacent ends of the strip, so as to overlap narrow end portions of the adjacent film strips, said splicing strip being partially sunk into the underlying portions of the thermoplastic bases of said film strips, and said thermoplastic bases having extrusions extending into and through said perforations in said splicing strip, with heads on the ends of large numbers of said extrusions interlocking with said splicing strip to interlock said splicing strip to said bases.

2. The subject matter of claim 1, wherein said foraminous splicing strip comprises a strip of fine mesh wire screen.

3. The subject matter of claim 2, wherein said splicing strip comprises a wire screen having a mesh size on the order of 150 to the inch.

4. The subject matter of claim 3, wherein the screen wire has a diameter on the order of .0025".

5. The subject matter of claim 4, wherein the screen has a thickness on the order of .004".

6. The subject matter of claim 2, wherein said screen strip is sunk into the bases of the film strips to a depth not substantially greater than half its thickness.

7. The subject matter of claim 6, wherein the screen has a thickness on the order of .004″–.006″.

8. The subject matter of claim 6, wherein the screen strip is sunk into the bases of the film strips to depths not substantially greater than half its thickness at the extremities of the film strips, and to reduced depths at the longitudinal edges of the screen strip.

9. The subject matter of claim 1, including also a thin layer of thermoplastic material overlying said foraminous splicing strip.

10. The subject matter of claim 1, wherein said foraminous splicing strip comprises a thin plate formed with a large multiplicity of fine, close-spaced perforations.

11. The subject matter of claim 3, wherein the screen has a mesh size between approximately 100 mesh and approximately 200 mesh to the inch.

12. The subject matter of claim 2, wherein the screen is characterized by single warp wires at the between meshes, and a plurality of weft wires between meshes.

References Cited

UNITED STATES PATENTS

| | | | |
|---|---|---|---|
| 2,974,566 | 3/1961 | Hurley | 156—275 XR |
| 2,569,764 | 10/1951 | Jonas | 156—275 XR |
| 2,969,106 | 1/1961 | Reibel et al. | 161—112 |

FOREIGN PATENTS 628,617  10/1961  Canada.

PHILIP DIER, Primary Examiner

U.S. Cl. X.R.

161—39, 114, 145, 214; 156—304, 157; 352—233